US008674832B1

(12) United States Patent
Thomas

(10) Patent No.: US 8,674,832 B1
(45) Date of Patent: Mar. 18, 2014

(54) WIRELESS BOLT LOCK REMOTE

(76) Inventor: Tregnel Kynta Thomas, Moss Point, MS (US)

( * ) Notice: Subject to any disclaimer, the term of this patent is extended or adjusted under 35 U.S.C. 154(b) by 842 days.

(21) Appl. No.: 12/823,583

(22) Filed: Jun. 25, 2010

(51) Int. Cl.

| | |
|---|---|
| ***E05B 45/06*** | (2006.01) |
| ***G05B 19/00*** | (2006.01) |
| ***G05G 5/00*** | (2006.01) |
| ***E05B 47/00*** | (2006.01) |
| ***E05B 17/00*** | (2006.01) |

(52) U.S. Cl.
USPC ........... 340/542; 340/5.61; 340/5.2; 340/527; 340/530; 70/221; 70/278.2; 70/279.1; 70/280; 70/472; 292/346; 292/347

(58) Field of Classification Search
USPC .......... 340/3.1, 5.1, 5.2, 5.22, 5.28, 5.6, 5.64, 340/5.7, 224, 527–530, 506, 505, 310, 340/545.1, 542, 825.31, 687, 686.2, 686.3, 340/686.4, 686.5, 539; 70/221, 222, 224, 70/278.1, 278.2, 279.1, 280, 281, 282, 70/283, 283.1, 472; 292/346, 347
See application file for complete search history.

(56) References Cited

U.S. PATENT DOCUMENTS

| | | | | |
|---|---|---|---|---|
| 4,760,380 | A * | 7/1988 | Quenneville et al. | 340/542 |
| 5,925,861 | A * | 7/1999 | Fromberg | 200/61.67 |
| 6,225,903 | B1 * | 5/2001 | Soloway et al. | 340/542 |
| 6,950,033 | B1 * | 9/2005 | Guyre | 340/687 |
| 6,963,280 | B2 * | 11/2005 | Eskildsen | 340/542 |
| 7,526,934 | B2 | 5/2009 | Conforti | |
| 7,741,969 | B2 * | 6/2010 | Linford | 340/542 |
| 2008/0136585 | A1 | 6/2008 | Eskildsen et al. | |

* cited by examiner

*Primary Examiner* — Daniel Wu
*Assistant Examiner* — Mancil Littlejohn
(74) *Attorney, Agent, or Firm* — Crose Law LLC; Bradley D. Crose

(57) ABSTRACT

A wireless bolt lock remote is disclosed. The wireless bolt lock remote includes a control circuit adapted for use with a bolt lock system and configured to detect a locked state and an unlocked state of a bolt lock, and upon detection of a change in state to wirelessly transfer a status to identity the detected state to an alarm system. The control circuit is wirelessly coupled to the alarm system for wireless communication. The wireless bolt lock remote includes a power source to supply power to the control circuit. Associated systems and methods for remote wireless security for bolt locks also are disclosed.

20 Claims, 5 Drawing Sheets

WIRELESS BOLT LOCK REMOTE

FIELD OF THE INVENTION

The technology described herein relates generally to the fields of alarms and access control systems. More specifically, the technology relates to a wireless bolt lock remote for residential and commercial alarms and the wireless arming and disarming of an alarm panel with the wireless bolt lock remote.

BACKGROUND OF THE INVENTION

Locking mechanisms such as bolt locks or dead bolts are known in the background art. A bolt lock is only moved to an open position by rotating the lock cylinder. Typically, a bolt lock is moved to an open or closed position with a key from either the inside or outside, or with a turn handle from the inside. As such, bolt locks are effective to increase resistance to entry.

Alarm systems and access control panels also are known in the background art. Currently there are a number of ways to remotely arm or disarm an alarm panel. Known solutions include the use of a key fob and remote access by phone or computer. These known solutions add to the steps required to secure a home or office and further complicate the process to arm or disarm an alarm panel. Furthermore, known systems and methods are often a hassle as many process steps are easy to forget, and/or too easy to forget, thus not maximizing the use of home or business alarms. In circumstances where there are multiple users to an alarm system, there are multiple units needed. In those cases if a unit is lost it must be deprogrammed from the panel or the external wireless receiver has to be deprogrammed or even replaced.

Related patents and published patent applications known in the art include the following: U.S. Pat. No. 7,526,934, issued to Conforti on May 5, 2009, discloses a door wireless access control system including reader, lock, and wireless access control electronics including wireless transceiver. U.S. Patent Application Publication No. 2008/0136585, filed by Eskildsen and published on Jun. 12, 2008, discloses a wireless control of security system with key-operated FOB.

The foregoing patent information reflects the state of the art of which the inventor is aware and is tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a wireless bolt lock remote for residential and commercial alarms and the wireless arming and disarming of an alarm panel with the wireless bolt lock remote.

In one exemplary embodiment, the technology described herein provides a wireless bolt lock remote. The wireless bolt lock remote includes: a control circuit adapted for use with a bolt lock system and configured to detect a locked state and an unlocked state of a bolt lock, and upon detection of a change in state to wirelessly transfer a status to identity the detected state to an alarm system, wherein the control circuit is wirelessly coupled to the alarm system for wireless communication; and a power source to supply power to the control circuit. The control circuit is disposed within the bolt lock system and is concealed from view.

The control circuit can include a switch wherein the switch is engaged to indicate the change of state between the locked state and the unlocked state of the bolt lock. Alternatively, the control circuit can include an activation strip wherein the activation strip is engaged to indicate the change of state between the locked state and the unlocked state or the bolt lock.

The wireless bolt lock remote can include a mounting bracket to secure the wireless bolt lock remote with the bolt lock system at a point of application of the bolt lock system.

The wireless bolt lock remote includes at least one sleeve adapted for use with the bolt lock system and configured to receive a screw such that the sleeved screw holds the bolt lock system and the wireless bolt lock remote securely in place.

The power source can be a battery. The power source can be an alternating current power source.

The wireless bolt lock remote can include a receiver wirelessly coupled to the control circuit and adapted for placement in an external alarm control system to receive signals transmitted from the control circuit and update the alarm control system as to the state of the bolt lock. The control circuit can be configured further with logic to arm the external alarm control system in an "away" mode when the bolt lock is turned from the unlocked state to a half-locked position for a predetermined period of time.

The wireless bolt lock remote can be configured to include a visual indicator to inform the home owner of the status of the alarm (whether armed or disarmed).

In yet another exemplary embodiment, the technology described herein provides a bolt lock system having a wireless remote. The bolt lock system includes: a bolt lock cylinder adapted for placement and use within a housing, such as a door, or the like that is adapted to be locked to a corresponding housing frame selectively for security; a bolt lock disposed within the bolt lock cylinder and adapted for operative extension and retraction to switch selectively between a locked state and an unlocked state; a control circuit adapted for use with the bolt lock and configured to detect the locked state and the unlocked state of the bolt lock, and upon detection of a change in state to wirelessly transfer a status to identity the detected state to an alarm system, wherein the control circuit is wirelessly coupled to the alarm system for wireless communication; and a power source to supply power to the control circuit. The control circuit and power source are disposed within the bolt lock system and are concealed from view.

The control circuit can include a switch wherein the switch is engaged to indicate the change of state between the locked state and the unlocked state of the bolt lock. Alternatively, the control circuit can include an activation strip wherein the activation strip is engaged to indicate the change of state between the locked state and the unlocked state or the bolt lock.

The bolt lock system also includes: a mounting bracket to secure the wireless bolt lock remote adjacent to the bolt lock and bolt lock cylinder; and a pair of sleeves to cover a pair of ends to the mounting bracket and each sleeve configured to receive a screw such that the sleeved screw holds the bolt lock system and the wireless bolt lock remote securely in place.

The bolt lock system also can include a receiver wirelessly coupled to the control circuit and adapted for placement in an external alarm control system to receive signals transmitted from the control circuit and update the alarm control system as to the state of the bolt lock.

The bolt lock system power source can be a battery. Alternatively, the bolt lock system power source can be an alternating current power source.

In yet another exemplary embodiment, the technology described herein provides a method to wirelessly inform an alarm control system as to the state of a bolt lock system to identify whether the bolt lock system is in a locked or unlocked state. The method includes: inserting and installing a control circuit adjacent to a bolt lock and bolt lock cylinder adapted for placement and use within a housing, such as a door, or the like that is adapted to be locked to a corresponding housing frame selectively for security; coupling wirelessly the control circuit to an alarm system for wireless communication; configuring the control circuit to detect the locked state and the unlocked state of the bolt lock; detecting the state of the bolt lock; wirelessly transferring, upon detection of a change in state a status to identity the detected state to an alarm system; providing a power source to supply power to the control circuit; and concealing from view the control circuit and power source within the bolt lock system.

The method also can include: providing a receiver adapted for placement in an external alarm control system to receive signals transmitted from the control circuit; wirelessly coupling the receiver to the control circuit; and updating the alarm control system as to the state of the bolt lock.

The method further can include: providing a mounting bracket to secure the wireless bolt lock remote adjacent to the bolt lock and bolt lock cylinder; providing a pair of sleeves to cover a pair of ends to the mounting bracket and each sleeve configured to receive a screw such that the sleeved screw holds the bolt lock system and the wireless bolt lock remote securely in place; and mounting the control circuit on the mounting bracket and securing the control circuit adjacent to the bolt lock. The power source in this method can be a battery or an alternating current power source.

The method further can include: providing a visual indicator to inform the home owner of the status of the alarm, whether armed or disarmed; and informing, visually, the home owner whether the bolt lock is armed or disarmed.

Advantageously, the wireless bolt lock remote and associated systems and methods provide a user the ability to arm a home or business alarm system without the use of the alarm's keypad code or other remote devices. The wireless bolt lock remote activates an alarm panel when a bolt lock is "locked" and disarms the alarm when the bolt lock is "unlocked," thereby eliminating the use of an alarm keypad or other remote device as a primary method of arming and disarming an alarm panel.

Also advantageously, the wireless bolt lock remote provides by simply locking a bolt lock from the inside or outside it arms or disarms alarm panels without out having to use or remember a code or push a button. This method does not require a person's memory to do anything but lock the bolt lock. This apparatus is concealed inside the bolt lock, so there are no components to lose or misplace. This device works with an existing bolt lock so there is no need for multiple units for multiple persons.

Further advantageously, wireless bolt lock remote is placed on the inside of a bolt lock, which transforms the original bolt lock itself into a remote. The wireless bolt lock remote is concealed so it is not seen once installed.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a wireless bolt lock remote for residential and commercial alarms and the wireless arming and disarming of an alarm panel with the wireless bolt lock remote.

Figure 1:
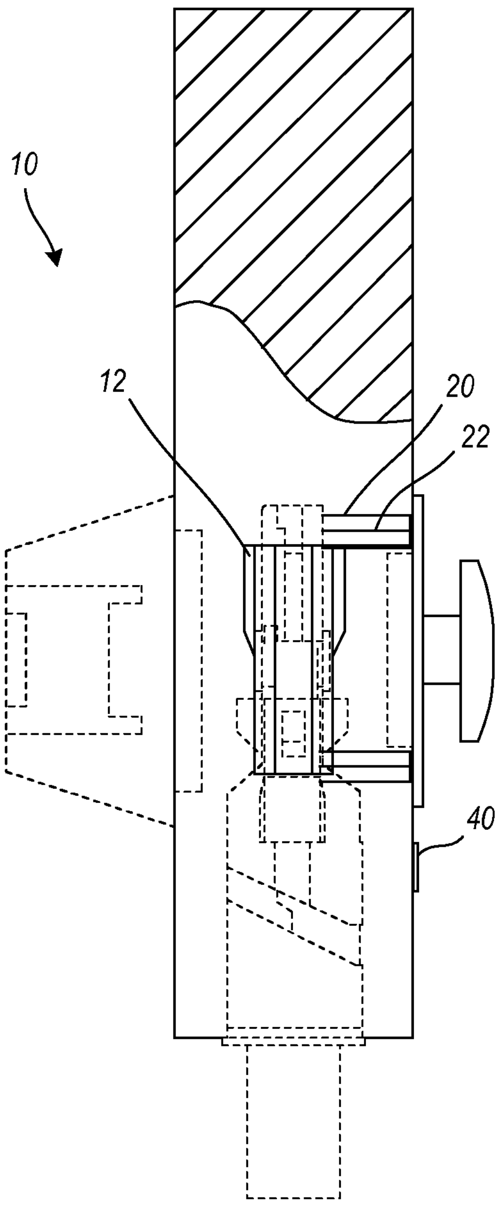
FIG. 1 is a top cross-sectional view of a wireless bolt lock remote, illustrating, in particular, the placement of the wireless bolt lock remote relative to a traditional bolt lock system, according to an embodiment of the technology described herein.
Figure 2:
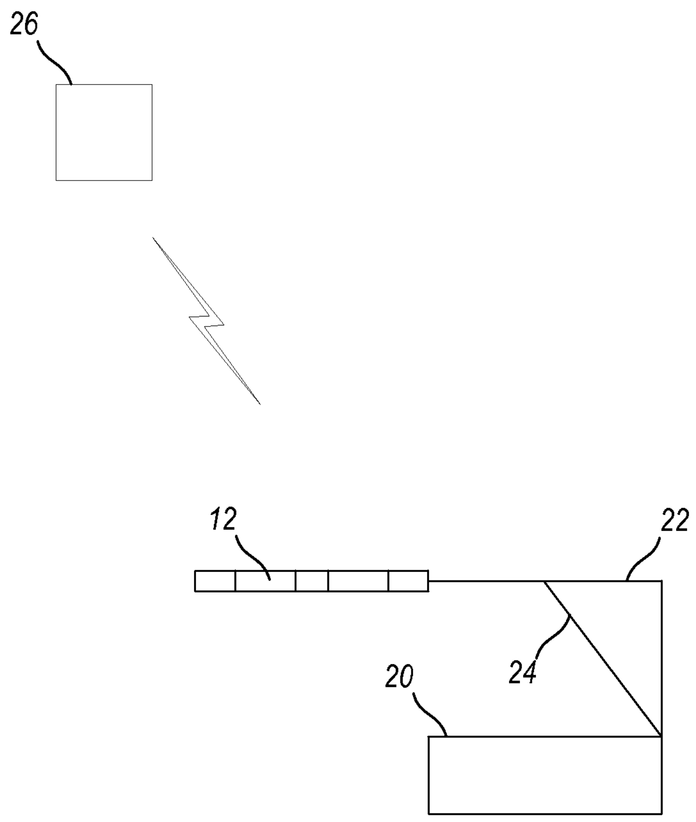
FIG. 2 is a side view of the wireless bolt lock remote depicted in FIG. 1, illustrating, in particular, a control circuit, according to an embodiment of the technology described herein.

Referring now to the Figures, a wireless bolt lock remote 10 is shown. As depicted specifically in FIG. 1, a top cross-sectional view of the wireless bolt lock remote 10, placement of the wireless bolt lock remote, with a door bolt lock cavity for example, relative to a traditional bolt lock system is shown. Known bolt lock components include a lock cylinder in which a bolt lock extends and retracts to lock and unlock, as selected by an operator.

Figure 5A:
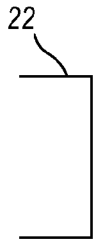
FIG. 5A is a side view of a bracket, according to an embodiment of the technology described herein.
Figure 5B:
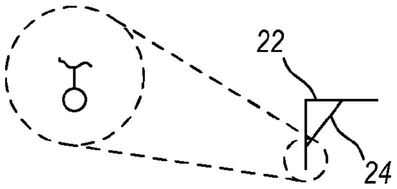
FIG. 5B is a side view of a portion of the bracket depicted in FIG. 5A and a brace, and illustrating, in particular, a close-up view of the bracket as it would appear viewed looking into a door from a bolt hole.

The wireless bolt lock remote 10 includes a mounting bracket 22 to secure the wireless bolt lock remote 10 with the bolt lock system at a point of application of the bolt lock system. FIG. 5A depicts an exemplary embodiment of a mounting bracket 22, defined by a shape suitable for use in a lock system, such as one in a traditional door having a cavity cut out for placement of a dead bolt system. The mounting bracket 22 is plastic in one embodiment; however, other suitable materials, such as a durable metal, can be utilized. The mounting bracket 22 can include a brace 24, such as corner brace 24 depicted in FIG. 5B.

Figure 4A:
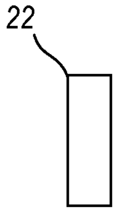
FIG. 4A is a top view of a sleeve, according to an embodiment of the technology described herein.
Figure 4B:
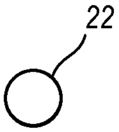
FIG. 4B is an end view of the sleeve depicted in FIG. 4A.

The mounting bracket 22 includes a sleeve 20 at each end. Each sleeve 20 is adapted for use with the bolt lock system and configured to receive a screw such that the sleeved screw holds the bolt lock system and the wireless bolt lock remote 10 securely in place. A top view of sleeve 20 is depicted in FIG. 4A. An end view of sleeve 20 is depicted in FIG. 4B. The sleeves 20 and mounting bracket 22 maintain the wireless bolt lock remote 10 securely against the bolt lock, such that as it is extended and retracted, the wireless bolt lock remote 10 is engaged.

The wireless bolt lock remote 10 includes a control circuit 12. The control circuit 12 is, for example, a printed circuit board. The control circuit 12 is adapted for use with a bolt lock system and configured to detect a locked state and an unlocked state of a bolt lock. Upon detection of a change in state the control circuit 12 is configured to wirelessly transfer a status to identity the detected state to an alarm system. The control circuit 12 is wirelessly coupled to the alarm system for wireless communication.

Figure 3:
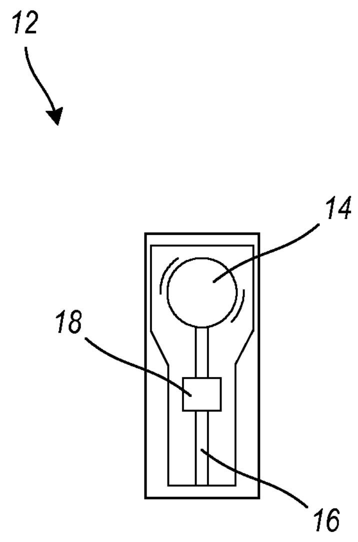
FIG. 3 is a top view of a control circuit, illustrating, in particular, an activation strip switch and a battery, according to an embodiment of the technology described herein.

The control circuit 12 includes a switch wherein the switch is engaged to indicate the change of state between the locked state and the unlocked state of the bolt lock. As depicted in FIG. 3, an activation strip 16 is utilized and shown, at 18, with the alarm in an "away" or locked mode. As the bolt lock extends and retracts the activation strip 16 is engaged.

The wireless bolt lock remote 10 can be configured to include a visual indicator 40 to inform the home owner of the status of the alarm (whether armed or disarmed).

The wireless bolt lock remote 10 includes a power source 14. The power source 14 can be a battery, as depicted in FIG. 3. Alternatively, the power source 14 can be an alternating current power source in a wired door, for example, coupled to a central power source. The power source 14 supplies power to the control circuit 12.

The wireless bolt lock remote 10 can include a receiver 26 in at least one embodiment. The receiver 26 is wirelessly coupled to the control circuit 12 and adapted for placement in an external alarm control system to receive signals transmitted from the control circuit 12 and update the alarm control system as to the state of the bolt lock.

The wireless bolt lock remote 10 is configured to arm an alarm panel in an "away" mode when the bolt lock is turned from an unlock position to a locked position and held in a half-locked position for a predetermined amount of time, e.g. three seconds. When the bolt is turned from a locked position towards an unlocked position and held in a half-locked position the wireless bolt lock remote 10 and control circuit 12 will transmit a signal to an alarm control panel to alarm in silent mode or with a siren, or the like. This provides the user with the advantage and option of arming the alarm in an "away" mode or "stay" mode. It further provides the user the advantage of a hidden panic alarm embedded in the key hole of the bolt lock.

In use, the wireless bolt lock remote 10 can be adapted to existing bolt lock systems. By way of example, an existing door with a dead bolt lock, can be fitted with the wireless bolt lock remote 10 to add the wireless alarm status functionality to the existing door.

Additionally, the wireless bolt lock remote 10 can be manufactured, sold, and utilized as a complete lock or complete door and lock systems.

A method to wirelessly inform an alarm control system as to the state of a bolt lock system to identify whether the bolt lock system is in a locked or unlocked state is disclosed. The following methods steps can be utilized as listed, and in alternative embodiments, with varying orders and omissions in carrying out the method steps. The method steps are as follows:

inserting and installing a control circuit adjacent to a bolt lock and bolt lock cylinder adapted for placement and use within a housing, such as a door, or the like that is adapted to be locked to a corresponding housing frame selectively for security;

coupling wirelessly the control circuit to an alarm system for wireless communication; configuring the control circuit to detect the locked state and the unlocked state of the bolt lock; detecting the state of the bolt lock;

wirelessly transferring, upon detection of a change in state a status to identity the detected state to an alarm system;

providing a power source to supply power to the control circuit; and concealing from view the control circuit and power source within the bolt lock system;

providing a receiver adapted for placement in an external alarm control system to receive signals transmitted from the control circuit;

wirelessly coupling the receiver to the control circuit; and updating the alarm control system as to the state of the bolt lock;

providing a mounting bracket to secure the wireless bolt lock remote adjacent to the bolt lock and bolt lock cylinder;

providing a pair of sleeves to cover a pair of ends to the mounting bracket and each sleeve configured to receive a screw such that the sleeved screw holds the bolt lock system and the wireless bolt lock remote securely in place; and mounting the control circuit on the mounting bracket and securing the control circuit adjacent to the bolt lock.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosed technology and are intended to be covered by the following claims.

What is claimed is:

1. A wireless bolt lock remote comprising:

a control circuit adapted for use with a bolt lock system and configured to detect a locked state and an unlocked state of a bolt lock, and upon detection of a change in state to wirelessly transfer a status to identify the detected state to an alarm system, wherein the control circuit is wirelessly coupled to the alarm system for wireless communication, and wherein the wireless bolt lock remote is configured to arm the alarm panel in an "away" mode when the bolt lock is turned from an unlock position to a locked position and held in a half-locked position for a predetermined amount of time, and configured to arm the alarm panel in a "stay" mode when the bolt is turned from a locked position towards an unlocked position and held in a half-locked position the wireless bolt lock remote and the control circuit will transmit a signal to the alarm panel to alarm in silent mode or with a siren, thereby to provide the user an option to arm selectively the alarm in an "away" mode or "stay" mode; and a power source to supply power to the control circuit.

2. The wireless bolt lock remote of claim 1, wherein the control circuit is disposed within the bolt lock system and is concealed from view.

3. The wireless bolt lock remote of claim 1, wherein the control circuit further comprises a switch wherein the switch is engaged to indicate the change of state between the locked state and the unlocked state of the bolt lock.

4. The wireless bolt lock remote of claim 1, wherein the control circuit further comprises an activation strip wherein the activation strip is engaged to indicate the change of state between the locked state and the unlocked state of the bolt lock.

5. The wireless bolt lock remote of claim 1, further comprising:

a mounting bracket to secure the wireless bolt lock remote with the bolt lock system at a point of application of the bolt lock system.

6. The wireless bolt lock remote of claim 1, further comprising:

at least one sleeve adapted for use with the bolt lock system and configured to receive a screw such that the sleeved screw holds the bolt lock system and the wireless bolt lock remote securely in place.

7. The wireless bolt lock remote of claim 1, wherein the power source is one of a battery and an alternating current power source.

8. The wireless bolt lock remote of claim 1, further comprising:

a visual indicator to inform the home owner of the status of the alarm, whether armed or disarmed.

9. The wireless bolt lock remote of claim 1, further comprising:

a receiver wirelessly coupled to the control circuit and adapted for placement in an external alarm control system to receive signals transmitted from the control circuit and update the alarm control system as to the state of the bolt lock; and wherein the control circuit is configured further with logic to arm the external alarm control system in an "away" mode when the bolt lock is turned from the unlocked state to a half-locked position for a predetermined period of time.

10. A bolt lock system having a wireless remote, the system comprising:

a bolt lock cylinder adapted for placement and use within a door housing and that is adapted to be locked to a corresponding housing frame selectively for security;

a bolt lock disposed within the bolt lock cylinder and adapted for operative extension and retraction to switch selectively between a locked state and an unlocked state;

a control circuit adapted for use with the bolt lock and configured to detect the locked state and the unlocked state of the bolt lock, and upon detection of a change in state to wirelessly transfer a status to identify the detected state to an alarm system, wherein the control circuit is wirelessly coupled to the alarm system for wireless communication, and wherein the wireless bolt lock remote is configured to arm the alarm panel in an "away" mode when the bolt lock is turned from an unlock position to a locked position and held in a half-locked position for a predetermined amount of time, and configured to arm the alarm panel in a "stay" mode when the bolt is turned from a locked position towards an unlocked position and held in a half-locked position the wireless bolt lock remote and the control circuit will transmit a signal to the alarm panel to alarm in silent mode or with a siren, thereby to provide the user an option to arm selectively the alarm in an "away" mode or "stay" mode; and a power source to supply power to the control circuit;

wherein the control circuit and power source are disposed within the bolt lock system and are concealed from view.

11. The bolt lock system having a wireless remote of claim 10, wherein the control circuit further comprises a switch wherein the switch is engaged to indicate the change of state between the locked state and the unlocked state of the bolt lock.

12. The bolt lock system having a wireless remote of claim 10, wherein the control circuit further comprises an activation strip wherein the activation strip is engaged to indicate the change of state between the locked state and the unlocked state of the bolt lock.

13. The bolt lock system having a wireless remote of claim 10, a mounting bracket to secure the wireless bolt lock remote adjacent to the bolt lock and bolt lock cylinder; and a pair of sleeves to cover a pair of ends to the mounting bracket and each sleeve configured to receive a screw such that the sleeved screw holds the bolt lock system and the wireless bolt lock remote securely in place.

14. The bolt lock system having a wireless remote of claim 10, further comprising:

a receiver wirelessly coupled to the control circuit and adapted for placement in an external alarm control system to receive signals transmitted from the control circuit and update the alarm control system as to the state of the bolt lock.

15. The bolt lock system having a wireless remote of claim 10, wherein the power source is one of a battery and an alternating current power source.

16. The bolt lock system having a wireless remote of claim 10, further comprising:

a visual indicator to inform the home owner of the status of the alarm, whether armed or disarmed.

17. A method to wirelessly inform an alarm control system as to the state of a bolt lock system to identify whether the bolt lock system is in a locked or unlocked state, the method comprising:

inserting and installing a control circuit, adapted for use with a bolt lock system and configured to detect a locked state and an unlocked state of a bolt lock, and upon detection of a change in state to wirelessly transfer a status to identify the detected state to an alarm system, wherein the control circuit is wirelessly coupled to the alarm system for wireless communication, adjacent to a bolt lock and bolt lock cylinder adapted for placement and use within a door housing and that is adapted to be locked to a corresponding housing frame selectively for security, and wherein the wireless bolt lock remote is configured to arm the alarm panel in an "away" mode when the bolt lock is turned from an unlock position to a locked position and held in a half-locked position for a predetermined amount of time, and configured to arm the alarm panel in a "stay" mode when the bolt is turned from a locked position towards an unlocked position and held in a half-locked position the wireless bolt lock remote and the control circuit will transmit a signal to the alarm panel to alarm in silent mode or with a siren, thereby to provide the user an option to arm selectively the alarm in an "away" mode or "stay" mode;

coupling wirelessly the control circuit to an alarm system for wireless communication;

configuring the control circuit to detect the locked state and the unlocked state of the bolt lock;

detecting the state of the bolt lock;

wirelessly transferring, upon detection of a change in state a status to identify the detected state to an alarm system;

providing a power source to supply power to the control circuit; and concealing from view the control circuit and power source within the bolt lock system.

18. The method of claim 17, further comprising:

providing a receiver adapted for placement in an external alarm control system to receive signals transmitted from the control circuit;

wirelessly coupling the receiver to the control circuit; and updating the alarm control system as to the state of the bolt lock.

19. The method of claim 17, further comprising:

providing a mounting bracket to secure the wireless bolt lock remote adjacent to the bolt lock and bolt lock cylinder;

providing a pair of sleeves to cover a pair of ends to the mounting bracket and each sleeve configured to receive a screw such that the sleeved screw holds the bolt lock system and the wireless bolt lock remote securely in place; and mounting the control circuit on the mounting bracket and securing the control circuit adjacent to the bolt lock.

20. The method of claim 17, further comprising:

providing a visual indicator to inform the home owner of the status of the alarm, whether armed or disarmed; and informing, visually, the home owner whether the bolt lock is locked or unlocked.

* * * * *